Patented Oct. 8, 1946

2,408,769

UNITED STATES PATENT OFFICE 2,408,769

METHOD OF PRODUCING SOLUTIONS OF CHLORIDES OF POLYVINYL

Maurice Louis Auguste Fluchaire, Lyon, France; vested in the Alien Property Custodian No Drawing. Application April 15, 1941, Serial No. 388,644. In France April 15, 1940

6 Claims. (Cl. 260—32)

This invention relates to a method of producing solutions of chlorides of polyvinyl and to the new industrial products resulting therefrom, the principal object of the invention being to provide solutions of chlorides of polyvinyl in cyclopentanone or its derivatives.

The chlorides of polyvinyl have certain very interesting properties which render them valuable as adhesive material, varnish and for all uses of plastic materials in general. Such chlorides however are not soluble except in a small number of solvents and, for varieties in degree of high polymerisation, the number is still more limited. Among the rare solvents for chloride of polyvinyl, one of the more usual is cyclohexanone.

The applicant has found—and it is that which constitutes the object of the present invention—that cyclopentanone and its derivatives constitute, for chloride of polyvinyl, and particularly chloride of polyvinyl of a high degree of polymerisation, solvents superior to cyclohexanone. This superiority manifests itself particularly by the fact that with an equal concentration of chloride of polyvinyl, the solutions in cyclopentanone are less viscous than solutions in cyclohexanone, that is to say, the solid contents of a solution of chloride of polyvinyl in cyclopentanone is higher than that of a solution in cyclohexanone presenting the same viscosity.

Such difference in behavior was not predictable from what was heretofore known of these substances. Cyclopentanone and cyclohexanone have in effect been regarded as solvents of various substances such as natural resins, cellulose esters, etc. But the two solvents have been until the present time considered as equivalents and there was no reason to suppose that in the case of chlorides of polyvinyl one of them would show a clear superiority over the other.

The placing in solution of chlorides of polyvinyl in cyclopentanone or methylcyclopentanone is effected in any suitable manner. For polymers of a high degree of concentration, it should be advantageous to effect the solution hot, while taking account of the fact that for a high concentration of chloride of polyvinyl, for example 200 grams per liter, the solution congeals on cooling into a gel. Practically, with chlorides of polyvinyl very strongly polymerized, one should prepare solutions of 150 grams per liter; solutions of lower polymers can be obtained with much higher concentrations.

Solutions prepared according to the invention may be added to certain liquids not in themselves solvents of chlorides of polyvinyl without any resulting precipitation of the substance dissolved. In this way solutions of 100 grams per liter may be added to an equal volume of acetate of ethyl, ligroine, acetone or trichlorethylene. The solutions may also be diluted, although to a lesser degree, with benzene, tetrachlorethan or ethyl or methyl alcohol. The new solvents may also be employed in admixture with other solvents, as for example cyclohexanone or methyl-tetrahydrofurane. Such additions may be made in the interest of economy or for convenience in the use of the solutions.

The solutions of polyvinyl in cyclopentanone or methylcyclopentanone, either indifferently, or diluted as described above, can be utilized for all the usual uses such as the manufacture of threads, filaments, films, varnish, veneerings, combinations, etc., according to current techniques.

Having thus described my invention, what I claim is:

1. The method of producing solutions of chlorides of polyvinyl which consists in dissolving said chlorides in cyclopentanone.

2. The method of producing solutions of chlorides of polyvinyl which consists in dissolving said chlorides in methyl-cyclopentanone.

3. A new industrial product comprising a solution of chloride of polyvinyl in cyclopentanone.

4. A new industrial product comprising a solution of chloride of polyvinyl in methyl-cyclopentanone.

5. The method of producing solutions of chlorides of polyvinyl which consists in dissolving said chlorides in a member of the group consisting of cyclopentanone and methyl-cyclopentanone.

6. A new industrial product comprising a solution of chloride of polyvinyl in a member of the group consisting of cyclopentanone and methyl-cyclopentanone.

MAURICE LOUIS AUGUSTE FLUCHAIRE.